(12) United States Patent
Malfait et al.

(10) Patent No.: US 8,363,938 B2
(45) Date of Patent: Jan. 29, 2013

(54) METHOD AND APPARATUS FOR ALIGNING SIGNALS

(75) Inventors: Ludovic Malfait, Ipswich (GB); Benjamin Pernot, Ipswich (GB)

(73) Assignee: Psytechnics Limited, Ipswich (GB)

( * ) Notice: Subject to any disclaimer, the term of this patent is extended or adjusted under 35 U.S.C. 154(b) by 893 days.

(21) Appl. No.: 12/427,212

(22) Filed: Apr. 21, 2009

(65) Prior Publication Data

US 2009/0279777 A1 Nov. 12, 2009

(30) Foreign Application Priority Data

May 2, 2008 (EP) .................................... 08103810

(51) Int. Cl.
*G06K 9/00* (2006.01)
(52) U.S. Cl. ......... 382/170; 382/208; 382/294; 382/309
(58) Field of Classification Search ........................ None
See application file for complete search history.

(56) References Cited

U.S. PATENT DOCUMENTS 7,627,477 B2 * 12/2009 Wang et al. .................... 704/273
7,705,881 B2 * 4/2010 Okamoto et al. ............. 348/180

FOREIGN PATENT DOCUMENTS

EP 2 031 882 3/2009
WO 2007/148479 12/2007

OTHER PUBLICATIONS

Rix et al., Perceptual Evaluation of Speech Quality (PESQ), The New ITU Standard for End-to-End Speech Quality Assessment, Part I—Time-Delay Compensation, J. Audio Eng. Soc., vol. 50, No. 10, Oct. 2002, pp. 755-764.*
European Patent Office examination report for application No. 08 103 810.1-2202, dated Jan. 3, 2012, 4 pages total.*
European Patent Office search report for application No. 08 103 810.1-2202, dated Sep. 29, 2008, 5 pages total.*
Sand et al., *Video Matching*, ACM Transactions on Graphics, Jan. 1, 2004, vol. 22, No. 3, pp. 592-599.
Mohan, *Video Sequence Matching*, Acoustics, Speech and Signal Processing, 1998, Proceedings of the 1998 IEEE International Conference, IEEE, vol. 6, May 12, 1998, pp. 3697-3700.

* cited by examiner

Primary Examiner — Brian P Werner
(74) Attorney, Agent, or Firm — Fenwick & West LLP

(57) ABSTRACT

This invention relates to alignment of signals, particularly for use in a quality assessment system. The invention provides a method and apparatus for aligning a first signal comprising a sequence of frames with a second signal comprising a sequence of frames, the method comprising the steps of: determining a similarity measure between each of a plurality of frames of the first signal and each of a plurality of frames of the second signal; assigning a matching value to each frame of the first signal wherein the matching value indicates a relative position of a matching frame in the second signal, by repeating the sub-steps of: generating a relative delay histogram the histogram comprising a set of values corresponding to each of a set of relative delays by: selecting a subset of frames of the first signal and for each frame of said subset identifying the frame of the second signal having the greatest similarity with said frame; determining the relative delay between the identified frame of the second signal and said frame of the first signal; and incrementing the value of the histogram corresponding to said relative delay; identifying one or more peaks in the relative delay histogram; and assigning the matching value to each frame contributing to a peak in dependence upon said identified peaks.

19 Claims, 7 Drawing Sheets

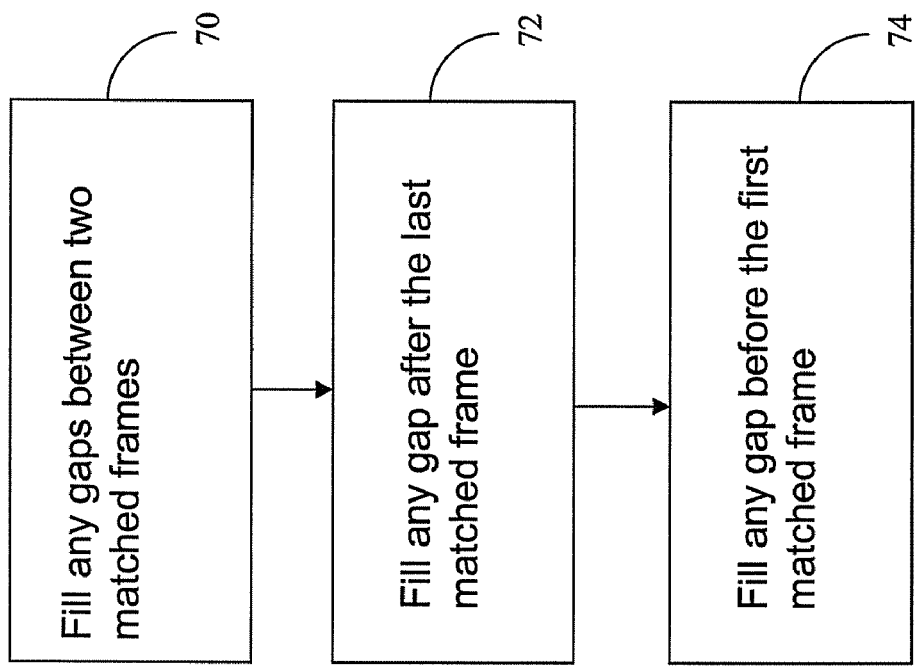

METHOD AND APPARATUS FOR ALIGNING SIGNALS

BACKGROUND a. Field of the Invention

This invention relates to alignment of signals, particularly for use in a quality assessment system where it is required to align a reference signal prior to transmission over a telecommunications network and a received signal corresponding to said reference signal subsequent to transmission over a telecommunications network. The signals are aligned to one another prior to analysing any degradation of the received signal in relation to the reference signal in order to assess the likely impact on the perceived quality of the received signal. The invention applies in particular to alignment of signals representing audio as well as to alignment of signals representing video, although alignment of signal containing other types of data is not precluded.

SUMMARY OF THE INVENTION

According to the invention there is provided a method of aligning a first signal comprising a sequence of frames with a second signal comprising a sequence of frames, the method comprising the steps of: determining a similarity measure between each of a plurality of frames of the first signal and each of a plurality of frames of the second signal; assigning a matching value to each frame of said plurality of frames of the first signal wherein the matching value indicates a relative position of a matching frame in the second signal, by repeating the sub-steps of: selecting a subset of frames of the first signal and generating a relative delay histogram, the histogram comprising a set of values corresponding to each of a set of relative delays by: for each frame of said subset identifying the frame of the second signal having the greatest similarity with said frame; determining the relative delay between the identified frame of the second signal and said frame of the first signal; and incrementing the value of the histogram corresponding to said relative delay; identifying one or more peaks in the relative delay histogram; and assigning a matching value to each frame contributing to a peak in dependence upon said identified peaks.

Preferably, the steps of selecting a subset of frames of the first signal and generating a relative delay histogram, identifying one or more peaks in the relative delay histogram and assigning the matching value to each frame contributing to a peak are repeated until each frame of said plurality of frames in the first signal have been included in a subset.

Preferably, the step of assigning a matching value further comprises the sub-step of assigning a confidence value to each identified peak, and in which the matching value and an associated confidence value is assigned to each frame in further dependence upon the confidence values of each identified peak.

In one embodiment, the confidence value is determined in dependence upon the number of frames in the selected subset which contributed to said identified peaks.

In a preferred embodiment, the step of assigning a matching value to each frame contributing to a peak comprises the sub-steps of: for each identified peak with a confidence value higher than a threshold: if the frame has no matching value and associated confidence value assigned then the matching value and the associated confidence value of the peak is assigned to the frame; if the frame has a matching value and associated confidence value assigned then in the event that the peak has a confidence value greater than the assigned associated confidence value the matching value and the associated confidence value of the peak is assigned to the frame.

Even more preferably the method further comprises the sub-step of; in the event that the peak has a confidence value equal to the assigned associated confidence value the matching value and the associated confidence value of the peak is assigned to the frame only in the event that the similarity between the frame and the frame associated with the current matching value is less than the similarity between the frame and the frame associated with the matching value of the peak.

The similarity measure may be derived from a correlation coefficient.

The first and second signals may comprise audio signals, in which case the similarity measure may be determined between a plurality of active frames of the first signal and a plurality of active frames of the second signal and in which an active frame comprises a frame containing speech.

The first and second signals may comprise video signals in which case the similarity measure may be determined between a plurality of active frames of the first signal and a plurality of active frames of the second signal and in which an active frame comprises a frame which is not static. The similarity measure may also be determined between a plurality of active frames of the first signal and a plurality of active frames of the second signal and in which an active frame comprises a frame which is not blank.

Where a subset is selected it may comprise a plurality of adjacent active frames.

A coarse alignment may be performed by performing the coarse alignment steps of: identifying a plurality of subsets of similar frames of the first signal; for example a scene in a video signal or a track in an audio signal, and selecting one or more active frames from each subset of similar frames of the first signal; and determining the similarity measure between said selected active frames of the first signal and a plurality of frames of the second signal.

The method may then further comprise the step of subsequently performing a fine alignment as described previously, where the plurality of frames of the first signal and the plurality of frames of the second signal to be aligned are selected in dependence upon the matching values generated during the coarse alignment steps.

The step of generating a similarity measure may comprise the sub-steps of: sub-sampling the plurality of frames of the first signal; and sub-sampling the plurality of frames of the second signal; prior to generating the similarity measure.

The method may further comprise: determining a frame which has no matching value assigned; and assigning a matching value in dependence upon a matching value assigned to a preceding frame and a matching value assigned to a subsequent frame.

The method may further comprise: determining a first matched frame to which a matching value is assigned; if the first matched frame is not the first frame of the sequence, assigning a matching value to preceding unmatched frames in dependence upon the matching value of the first matched frame.

The method may further comprise: determining a last matched frame to which a matching value is assigned; if the last matched frame is not the last frame of the sequence, assigning a matching value to preceding unmatched frames in dependence upon the matching value of the last matched frame.

According to another aspect of the invention there is provided a method of signal quality assessment comprising the steps of: transmitting a reference signal to provide a transmitted signal; receiving said transmitted signal to provide a received signal; comparing the received signal to the reference signal; and generating a quality measure in dependence upon said comparison; characterised in that the step of comparing said received signal to said reference signal comprises the sub-steps of aligning the reference signal and the received signal as described above prior to comparing the received signal to the reference signal.

The quality measure may be stored for visualisation and analysis by a user;

An apparatus, a computer program and a computer readable medium carrying a computer program for performing the method of the invention are also provided.

BRIEF DESCRIPTION OF THE DRAWINGS

The invention will now be described, by way of example only, with reference to the accompanying drawings, in which:

FIG. 7 is a flow chart illustrating optional substeps which may be carried out after the time-alignment process illustrated in FIG. 3.

DETAILED DESCRIPTION

Figure 1:
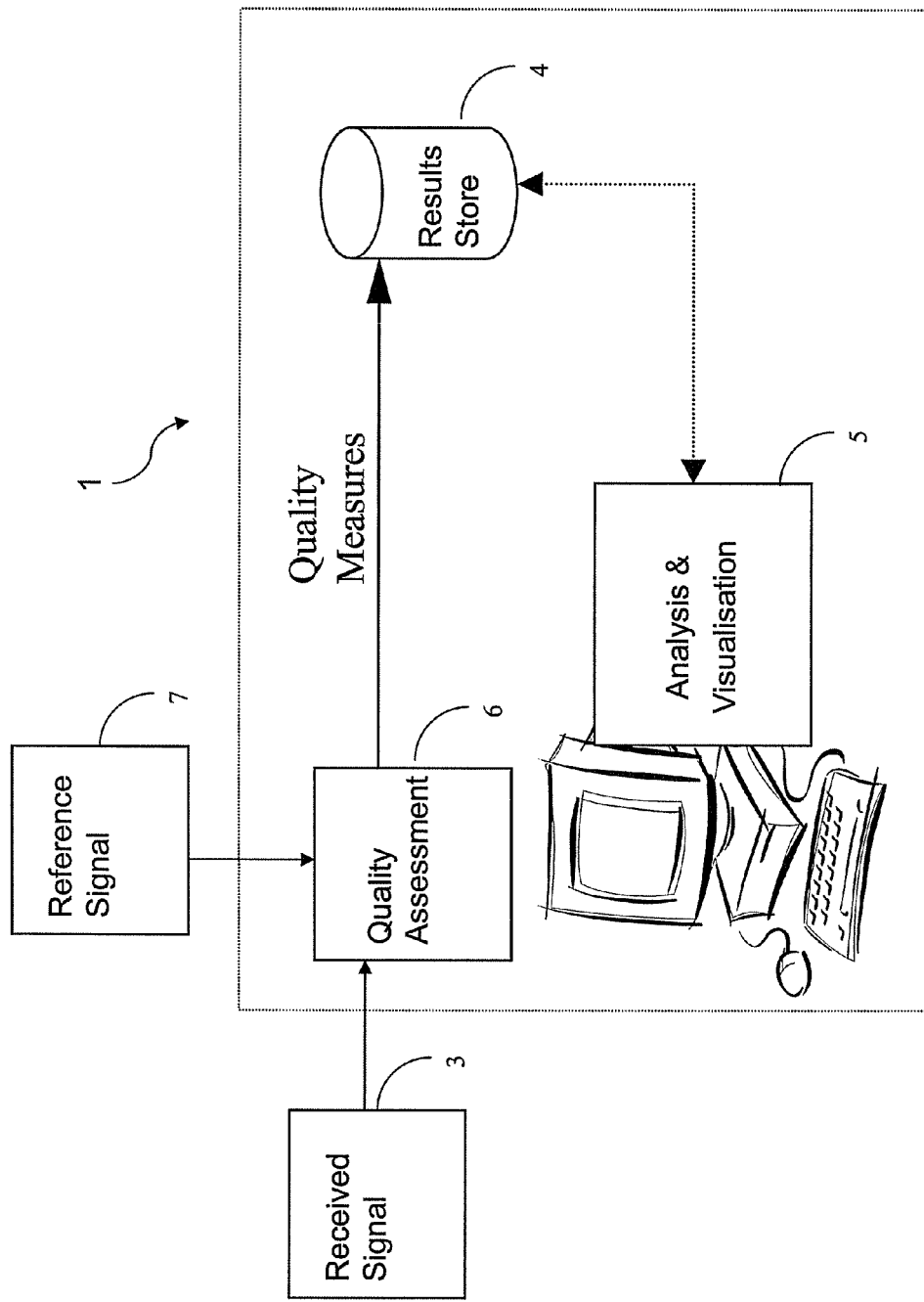
FIG. 1 illustrates a full-reference quality assessment system.

Referring to FIG. 1, a 'full-reference' quality assessment system is illustrated. A full-reference system is described as such because a received signal 3 is analysed alongside a reference signal 7 by a quality assessment system 6. A 'no-reference' system relies on the received signal 3 alone to carry out a quality assessment. Quality assessment results (in the form of mean opinion scores) are stored in a data store 4 for use in an analysis and visualisation module 5.

Figure 2:
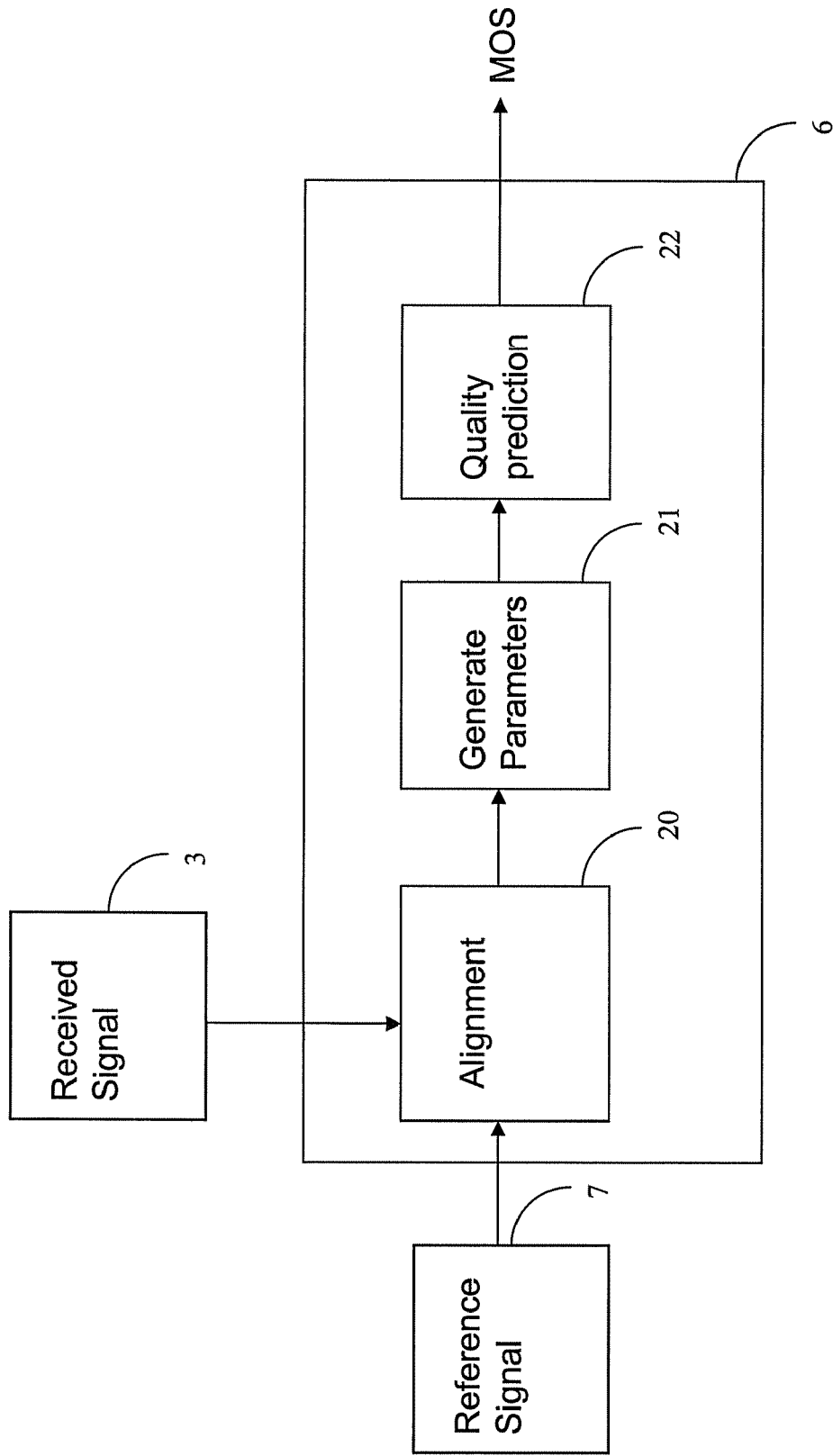
FIG. 2 illustrates the quality assessment module of FIG. 1.

Referring to FIG. 2, an original (reference) signal 7 is encoded and transmitted via a telecommunications channel. The reference signal 7 and a corresponding received signal 3 are aligned by a time alignment module 20 prior to comparison of the reference signal 7 and the decoded signal 3 in a parameter generation module 21.

Parameters are generated by parameter generation module 21 based on a comparison of the time aligned received signal 3 which may have become degraded and the reference signal 7. Parameters are then used by quality prediction module 22 used to generate a mean opinion score (MOS).

Quality prediction models typically produce a set of intermediate parameters from the input signal (or signals in the case of a full-reference model) such that each parameter changes in response to the presence and severity of one or more classes of image impairment. Said intermediate parameters are then combined to produce a single quality prediction value that correlates with the mean opinion score (MOS) that would be obtained for the decoded input signal when assessed by human subjects in a subjective experiment. The parameter combination step can be a simple weighted sum. Methods for optimising the relative weights of the parameters, like multi-variable regression, are well known to those skilled in the art and are not directly relevant to the present invention. An example of a video quality prediction model that uses an intermediate set of parameters as described above is provided in Annex A of ITU-T Recommendation J.144, "Objective perceptual video quality measurement techniques for digital cable television in the presence of a full reference", with the weighted sum of the parameters performed according to Equation A.4-2. ITU-R Recommendation BT-500, "Methodology for the subjective assessment of the quality of television pictures" describes methods of performing subjective experiments for video signals.

Time alignment module 20 will now be described in more detail with reference to FIG. 3. A coded speech or video signal is generally divided into frames, each frame representing a predetermined portion, or time period, of speech or video. The aim of the time alignment module 20 is to associate a received frame with each of the reference frames, when possible. Such time-alignment may be done by sequentially processing subsets of overlapping frames in the reference signal and attempting to identify matching frames in the received signal. However, it will be clear to those skilled in the art that the process may also be performed by sequentially processing subsets of frames in the received signal and attempting to identify matching frames in the reference signal.

Figure 3:
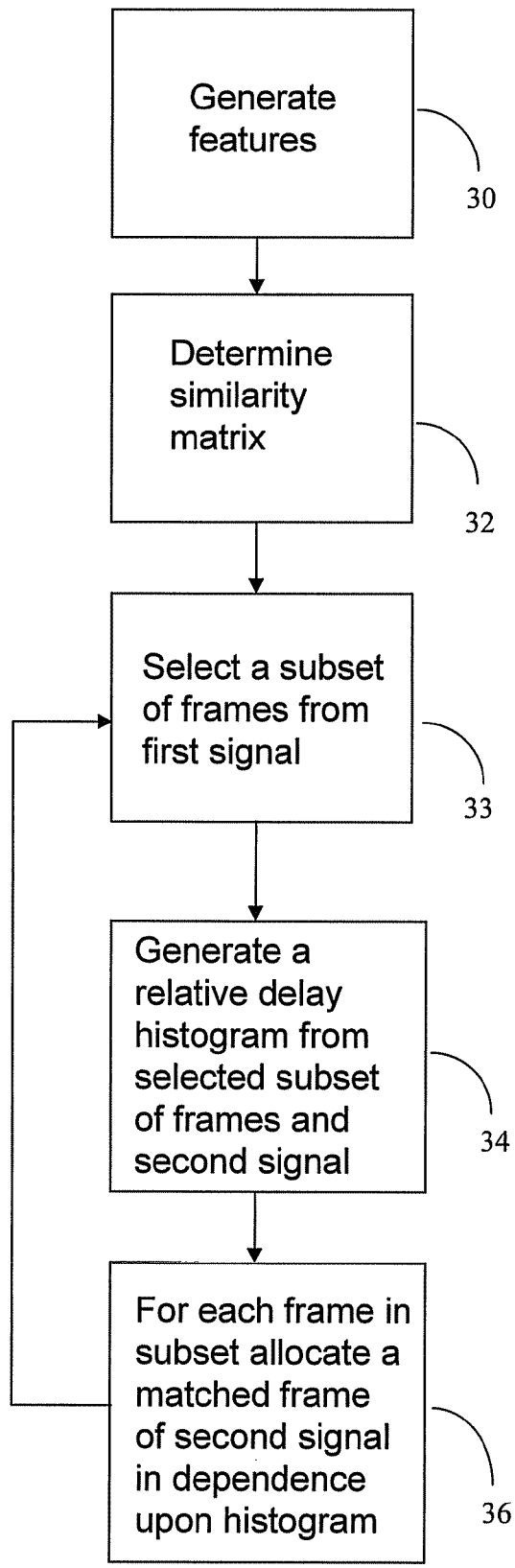
FIG. 3 is a flow chart illustrating the steps carried out by a time alignment module of FIG. 2.

FIG. 3 gives a broad overview of the time alignment process. At step 30 features are generated from each frame in both the reference and the received signals. At step 32 a similarity matrix is determined, where the similarity matrix comprises a matrix of similarity measures obtained by comparing features of a plurality of frames of the reference signal with features of a plurality of frames of the received signal. At step 33 a subset of consecutive frames is selected starting at the first active frame of the reference or received signal referred to herein as the first signal, then at step 34 a relative delay histogram is created from the subset of active frames in relation to the other signal referred to herein as the second signal. At step 36 each selected frame of the subset may be assigned to a matching frame of the second signal in dependence upon the relative delay histogram generated at step 34. At step 33 a new, overlapping, subset is formed starting at the next active frame in the first signal after the first frame in the current subset. Steps 34 and 36 are then repeated until all active frames in the first signal have been included in a subset.

Feature generation at step 30 will now be described in one embodiment of the invention relating to video signals. Video frames are transformed to form a single dimensional vector before time alignment is performed.

Video frames and still images are typically stored in one of two colour space formats: YUV or RGB. Both formats decompose the picture into three components such that each pixel is represented by three values. In YUV format the three components are a single luminance value (Y) and two chrominance values (U and V). In RGB format the three components are Red (R), Green (G) and Blue (B). In the preferred embodiment of the invention alignment is carried out on the basis of video stored in the YUV colour space. RGB frames are therefore converted to YUV before generation of features. Each video frame from the reference and received signals is transformed by sub-sampling and then flattening into a one dimensional array of values as will be described below.

It is possible to perform video time-alignment without sub-sampling although it is advantageous to use sub-sampling for several reasons:
1. It considerably reduces the processing time, especially for high resolution frames
2. It compensates for small spatial shifts between the reference and the received frames 3. It enables the alignment of video signals even if the reference and the received frames are of different resolutions by sub-sampling to a common resolution (note that if the aspect ratios of the two video signals are different, additional processing may be required such as cropping).

Figure 4:
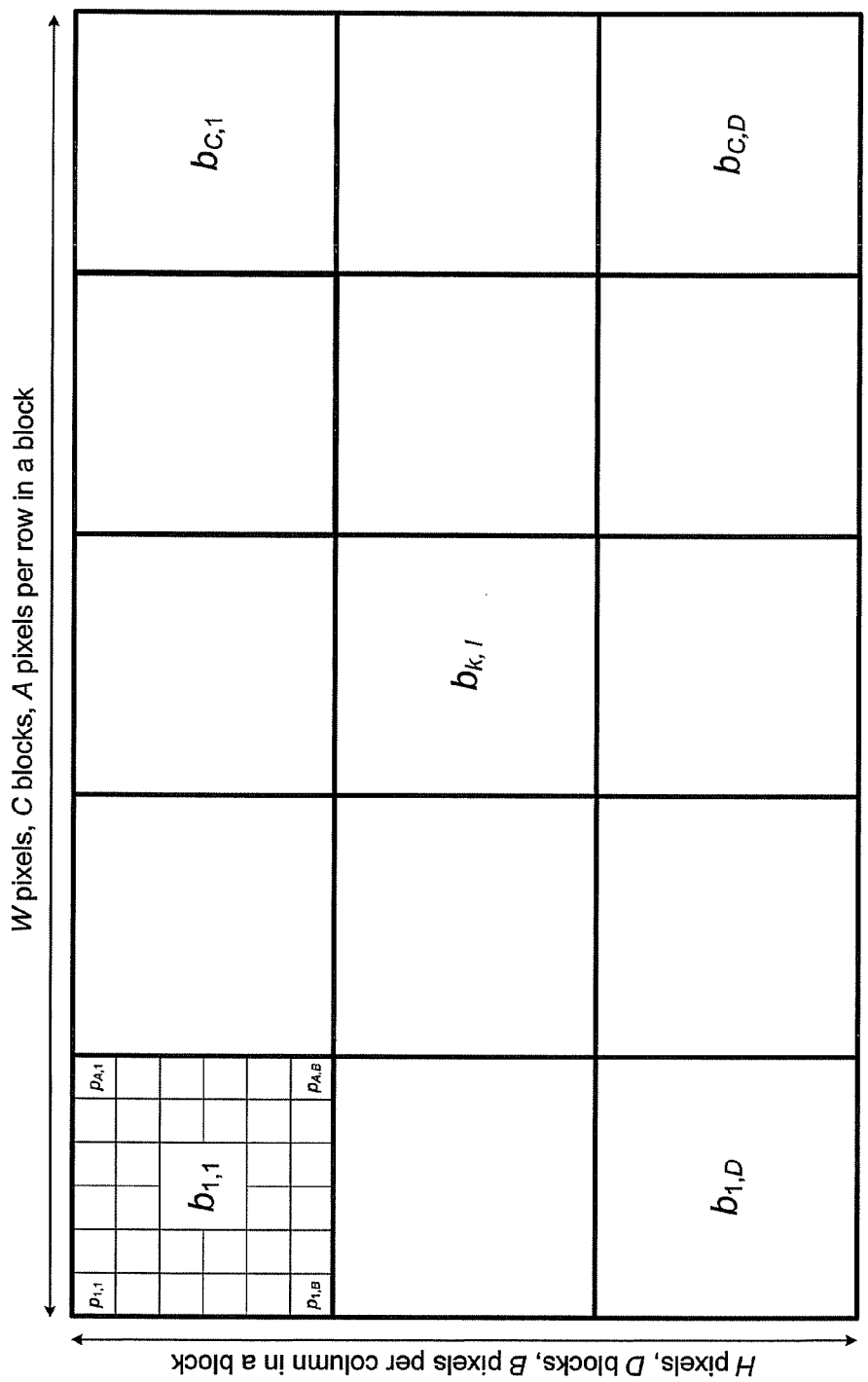
FIG. 4 shows the structure of a video frame in one embodiment of the invention.

The structure of a video frame is shown in FIG. 4. A frame comprises a matrix of pixels with W columns and H rows. Each pixel is defined by 3 values (Y, U and V components). The three components are not represented in FIG. 4, but the sub-sampling is performed for each of the Y, U and V components. The sub-sampling is performed by averaging blocks of pixels as described in the following equation:

$$b_{k,l} = \frac{1}{AB} \sum_{x=1}^{A} \sum_{y=1}^{B} p_{(k-1)A+x,(l-1)B+y}$$

where A and B represent the number of pixels per row and column within a block, $p_{x,y}$ the value (Y, U or V) of the pixel at position (x,y) in the image and $b_{k,l}$ is the resulting sub-sampled value at block position (k,l).

The sub-sampled frames are then flattened by concatenating each row. It is also possible to flatten sub-sampled frames by concatenating columns instead—the important thing is that both the reference and received signals are flattened the same way. Three vectors are generated per frame, one for each YUV component $$\begin{cases} y = [b_{1,1} & \ldots & b_{C,1} & b_{1,2} & \ldots & b_{i,j} & \ldots & b_{C,D}] \\ u = [b_{1,1} & \ldots & b_{C,1} & b_{1,2} & \ldots & b_{i,j} & \ldots & b_{C,D}] \\ v = [b_{1,1} & \ldots & b_{C,1} & b_{1,2} & \ldots & b_{i,j} & \ldots & b_{C,D}] \end{cases}$$

Where for each of the vectors y u v, $b_{k,l}$ represents the value of the sub-sampled frame at block position (k,l) for the component Y, U and V respectively. C and D are the number of blocks per row and per column in the sub-sampled frame. In this example, rows have been concatenated rather than columns.

An optional step is to normalize the received signal against the reference signal to compensate for modifications of the received frames in terms of contrast, brightness, etc. A normalization process is performed independently for each block position in the vectors based on an analysis of the entire video sequence. This means that the normalization can also compensate for systematic artifacts such as the presence of logo added into the received signal.

The normalization process is performed on the one dimensional, or flattened, frames. For both reference and received frames, the average block values across frames are calculated for y, u and v vectors:

$$\bar{y} = \left[ \sum_{i=1}^{L} \frac{y_{i,1}}{L} \quad \ldots \quad \sum_{i=1}^{L} \frac{y_{i,j}}{L} \quad \ldots \quad \sum_{i=1}^{L} \frac{y_{i,M}}{L} \right]$$

where M is the number of elements in vector y, j the index of the element in vector y, L the number of video frames and i the frame index. The same equation applies for U and V components.

A transfer function vector is estimated by calculating the ratio between corresponding elements in the averaged received and reference vectors. The minimum value for resulting averages is set to 1 to avoid division by zero.

$$t = \left[ \frac{\max(1, \overline{ydeg}_1)}{\max(1, \overline{yref}_1)} \quad \ldots \quad \frac{\max(1, \overline{ydeg}_j)}{\max(1, \overline{yref}_j)} \quad \ldots \quad \frac{\max(1, \overline{ydeg}_M)}{\max(1, \overline{yref}_M)} \right]$$

where t is the transfer function estimation vector, $ydeg_j$ the jth element of the averaged $\overline{ydeg}$ vector of the received video, $yref_j$ the jth element of the averaged $\overline{yref}$ vector of the reference video. The same equation applies for U and V components.

Reference and received one dimensional frames are then weighted with the transfer function estimation. Each weighting is applied to either the reference or the received frames such that frame values are only ever decreased, not increased.

The transfer function is therefore applied to the reference frames as follows:

$$yrefnorm_a = [\min(1,t_1) \cdot yref_{a,1} \ldots \min(1,t_j) \cdot yref_{a,j} \ldots \min(1,t_M) \cdot yref_{a,M}]$$

where $yrefnorm_a$ represents the normalized $yref_a$ vector of the $a^{th}$ reference frame, $yref_{a,j}$ the jth element of this vector and $t_j$ the $j^{th}$ element of the transfer function t for the Y component. A corresponding equation applies for U and V components.

The transfer function is applied to the received signal as follows:

$$ydegnorm_b = \left[ \frac{ydeg_{b,1}}{\max(1, t_1)} \quad \ldots \quad \frac{ydeg_{b,j}}{\max(1, t_j)} \quad \ldots \quad \frac{ydeg_{b,M}}{\max(1, t_M)} \right]$$

where $ydegnorm_b$ represents the updated flattened $ydeg_b$ vector of the $b^{th}$ received frame, $ydeg_{b,j}$ the $j^{th}$ element of this vector and $t_j$ the $j^{th}$ element of the transfer function t for the Y component. A corresponding equation applies for U and V components.

Feature generation at step 30 will now be described in one embodiment of the invention relating to audio signals.

Each audio frame taken from the reference and received signals is processed by calculating and optionally sub-sampling the power spectrum.

For example a frame of pulse code modulated (PCM) audio samples, s, may be transformed into a power spectrum, before the time alignment is performed using a Discrete Fourier Transform (DFT):

$$X_k = \sum_{n=1}^{N} w_n s_n e^{-2\pi \frac{(n-1)k}{N} j}$$

where X is the complex Fourier spectrum, N is the size of the DFT, s is the N-sample PCM audio frame to be transformed and w is a window function.

The complex spectrum produced by the DFT, X, is converted to a power spectrum, W, by calculating the product of each spectral coefficient $X_i$ and its complex conjugate $X_i^*$.

$$W_k = \sum_{k=0}^{N-1} X_k X_k^*$$

where W is the power spectrum of the N-sample PCM audio frame s.

When the preferred embodiment is applied to an audio signal sampled at 16 kHz a 512-point DFT is calculated every 128 samples from (75%) overlapping audio frames using a Hann window function. The time-alignment values allocated to a given pair of reference and received frames effectively correspond to the central 128 samples of the windows used to calculate the associated DFTs. Other sample rates can be addressed by increasing or decreasing the DFT size as appropriate.

Again, it is possible to perform the audio time-alignment without sub-sampling although it is recommended to use sub-sampling for several reasons:
1. It reduces the processing time of the subsequent steps.
2. It compensates for small frequency shifts between the reference and the received frames.

Sub-sampling is performed by forming a new sub-sampled vector, b, from each power spectrum vector by averaging adjacent power spectrum coefficients $$b_i = \sum_k W_k \text{ where } k \in [d_i, d_{i+1} - 1]$$

where the pair of boundary values $d_i$ and $d_{i+1}$ determine which elements of the power spectrum contribute to the $i^{th}$ element of the sub-sampled vector b.

It is only necessary to compute elements of the sub-sampled vector from the first half of the power spectrum because the power spectrum of a non-complex signal is essentially symmetrical about the centre of the spectrum.

An optional step is to normalize the received signal against the reference signal to compensate for large modifications of received frames, such as scaling. A normalization process is performed independently for each element in the sub-sampled power vectors based on an analysis of the entire audio signal. This means that the normalization can also compensate for systematic artifacts in the received signal such as additive noise in a particular frequency band.

The normalization process is performed on the sub-sampled power vectors. For both reference and received frames, the average value of the sub-sampled vector across frames is calculated as follows:

$$\overline{b} = \left[ \sum_{i=1}^{L} \frac{b_{i,1}}{L} \ldots \sum_{i=1}^{L} \frac{b_{i,j}}{L} \ldots \sum_{i=1}^{L} \frac{b_{i,M}}{L} \right]$$

where M is the number of elements in vector $b_i$, j the index of the element in sub-sampled power vector $b_i$, L is the number of audio frames and i the frame index.

A transfer function vector is estimated by calculating the ratio between corresponding elements in the averaged received and reference vectors. The minimum value for resulting averages is set to 1 to avoid division by zero.

$$t = \left[ \frac{\max(1, \overline{bdeg}_1)}{\max(1, \overline{bref}_1)} \ldots \frac{\max(1, \overline{bdeg}_j)}{\max(1, \overline{bref}_j)} \ldots \frac{\max(1, \overline{bdeg}_M)}{\max(1, \overline{bref}_M)} \right]$$

where t is the transfer function estimation vector, $\overline{bref}_j$ is the jth element of the averaged sub-sampled power vector of the reference audio signal, $\overline{bdeg}_j$ is the jth element of the averaged sub-sampled power vector of the received audio signal.

Reference and received sub-sampled power vectors are then weighted with the transfer function estimation. The weighting is applied to either the reference or the received signal such that values are only ever decreased, not increased. This avoids amplifying signal components that could adversely affect the time-alignment process.

The transfer function is therefore applied to the reference frames as follows:

$$\text{brefnorm}_a = [\min(1,t_1) \cdot bref_{a,1} \ldots \min(1,t_j) \cdot bref_{a,j} \ldots \min(1,t_M) \cdot bref_{a,M}]$$

where $\text{brefnorm}_a$ represents the normalized $bref_a$ vector of the $a^{th}$ reference frame, $bref_{a,j}$ $j^{th}$ element of this vector and $t_j$ the $j^{th}$ element of the transfer function t.

The transfer function is applied to the received signal as follows:

$$bdegnorm_b = \left[ \frac{bdeg_{b,1}}{\max(1, t_1)} \ldots \frac{bdeg_{b,j}}{\max(1, t_j)} \ldots \frac{bdeg_{b,M}}{\max(1, t_M)} \right]$$

where $bdegnorm_b$ represents the normalized $bdeg_b$ vector of the $b^{th}$ reference frame, $bdeg_{b,j}$ $j^{th}$ element of this vector and $t_j$ the $j^{th}$ element of the transfer function t.

An additional optional step is to reduce the size of the vectors $\text{brefnorm}_a$ and $bdegnorm_b$ based on the transfer function estimation vector t. If the ith element $t_i$ is greater than an upper threshold or less than a lower threshold, then the ith element from vectors $\text{brefnorm}_a$ and $bdegnorm_b$ is removed. In the preferred embodiment an upper threshold of 100 and lower threshold of 0.01 are used.

It is advantageous if later steps in the time-alignment process are restricted to frames containing a signal of interest. For example, if the time-alignment process is being used in a voice quality assessment model, it is useful to identify those frames that contain speech. Methods for classifying speech signals into periods of speech and background noise are called voice activity detection (VAD) algorithms and are well known in the art. Similarly, methods of detecting silence in more general audio signals, such as television and film soundtracks, are also well known.

Similarly if the time-alignment process is being used in a video quality assessment model it is useful to identify static frames which are not to be used in the time alignment process. A frame is marked as static if its similarity with the preceding frame is greater than a threshold. If the previous frame is also marked as static, then the similarity between the current frame and the first frame in the current sequence of consecutive static frames is also calculated and this second similarity must also be greater than the threshold for the current frame to be marked as static. This second check prevents a sequence of very slow motion video from being completed marked as static. The use of correlation as the similarity measure with a frame detection threshold of 0.999 has been found to work well.

Furthermore, blank frames in a video signal may not be considered by the alignment process in one embodiment of the invention. A blank frame is defined as being a frame of uniform colour (for example white, blue or black frames are blank frames). A frame is marked as blank if the average standard deviation of the three components (Y,U,V) for the given frame is lower than a threshold. The optimum threshold value depends on the degree of sub-sampling. A value of 1000/N has been found to work well where N is the number of blocks per frame.

Frames classified as being of interest will be referred to as active frames hereafter, although if no such classification step has been made then all frames will be active frames.

Determination of a similarity matrix at step 32 will now be described in more detail.

In the preferred embodiment of the invention the similarity matrix is generated based on a correlation coefficient using the following equation:

$$\rho(x, y) = \frac{\text{cov}(x, y)}{\sigma(x)\sigma(y)} = \frac{\sum_{j=0}^{M-1}(x_j - \bar{x})(y_j - \bar{y})}{\sqrt{\sum_{j=0}^{M-1}(x_j - \bar{x})^2 \sum_{j=0}^{M-1}(y_j - \bar{y})^2}}$$

$$\text{where } \bar{x} = \frac{1}{M}\sum_{j=0}^{M-1} x_j \text{ and } \bar{y} = \frac{1}{M}\sum_{j=0}^{M-1} y_j,$$

and where x and y are two vectors of M elements to correlate, $x_j$ and $y_j$ the $j^{th}$ element in vectors x and y respectively.

For comparison of signals comprising more than one vector an average of the respective correlation coefficients may be used to generate the similarity matrix. For example for a video signal using three vectors (Y, U, V) for each frame a, the three vectors $yref_a$, $uref_a$, $vref_a$ are correlated separately. The 3 correlation values are then averaged to obtain a single correlation value for a given reference frame a and received frame b comparison:

$$r_{a,b} = \frac{\rho(yref_a, ydeg_b) + \rho(uref_a, udeg_b) + \rho(vref_a, vdeg_b)}{3},$$

where $yref_a$, $uref_a$, $vref_a$ and $ydeg_b$, $udeg_b$, $vdeg_b$ vectors represent the features generated by step 30 for a reference frame a and a received frame b (optionally sub-sampled and normalised).

Where there is only one vector used in the comparison, for example in audio, the correlation coefficient may be used directly: ie $$r_{a,b} = \rho(bref_a, bdeg_b),$$

where $bref_a$ and $bdeg_b$ vectors represent the features generated by step 30 for a reference frame a and a received frame b (optionally sub-sampled and normalised).

The similarity matrix in the case of both audio and video signals in the preferred embodiment is therefore $$R = \begin{bmatrix} r_{1,1} & \cdots & r_{A,1} \\ \vdots & r_{a,b} & \vdots \\ r_{1,B} & \cdots & r_{A,B} \end{bmatrix}$$

where $r_{a,b}$ is the correlation value from the comparison between frame a of the reference signal with frame b of the received signal, A and B are the number of frames in the reference and received signals respectively.

Although the similarity matrix described is based on a correlation coefficient calculation, it will be apparent to those skilled in the art that other measures of similarity can be used, for example, mean square error, root mean square error, absolute mean error, Minkowski distance, angular separation, . . . .

The generation of the delay histogram at step 34 will now be described with reference to FIG. 5.

In the preferred embodiment of a video signal time alignment system the time-alignment process is carried out by sequentially processing overlapping subsets of successive (after optionally discarding inactive frames) frames in the received video signal and attempting to identify matching frames in the reference signal. In the preferred embodiment of an audio time alignment system the time-alignment process is carried out by sequentially processing overlapping subsets of successive (after optionally discarding inactive frames) frames in the reference audio signal and attempting to identify matching audio frames in the received signal. However, it will be clear to those skilled in the art that the time-alignment can be carried out either way in either case, and both cases are covered by the claimed invention.

For each subset of frames selected from a first signal (either the reference or the received signal) referred to as the current subset in subsequent steps, a histogram is generated where the position of a bin in the histogram represents a relative delay between the first signal and the second signal and the value of a bin represents a number of frames; said histogram bins will be referred to hereafter as relative delays. The histogram is populated as follows.

At step 50 each relative delay in the histogram is set to zero.

In the preferred embodiment of the invention the subset comprises ten successive active frames (having first discarded any inactive frames). At step 52 for a frame in the subset, the relative delay of the frame in the second signal having the greatest similarity with the selected frame is determined.

Then at step 56 the corresponding relative delay in the histogram is incremented. Steps 52 and 56 are repeated until all of the frames of the selected subset have been considered.

In the most general case a search range covering all possible relative delays between the first and second signals is used. However, it may be advantageous to restrict the range of frames in the second signal that are searched if a-priori knowledge of the maximum possible positive and negative relative delays is available, or if, for example if a prior coarse alignment has been carried out.

In an alternative embodiment, each selected frame of the first signal can be used to update the histogram multiple times, for example on the basis of a similarity threshold, the best N matching frames, or a combination of the two criteria.

Figure 6:
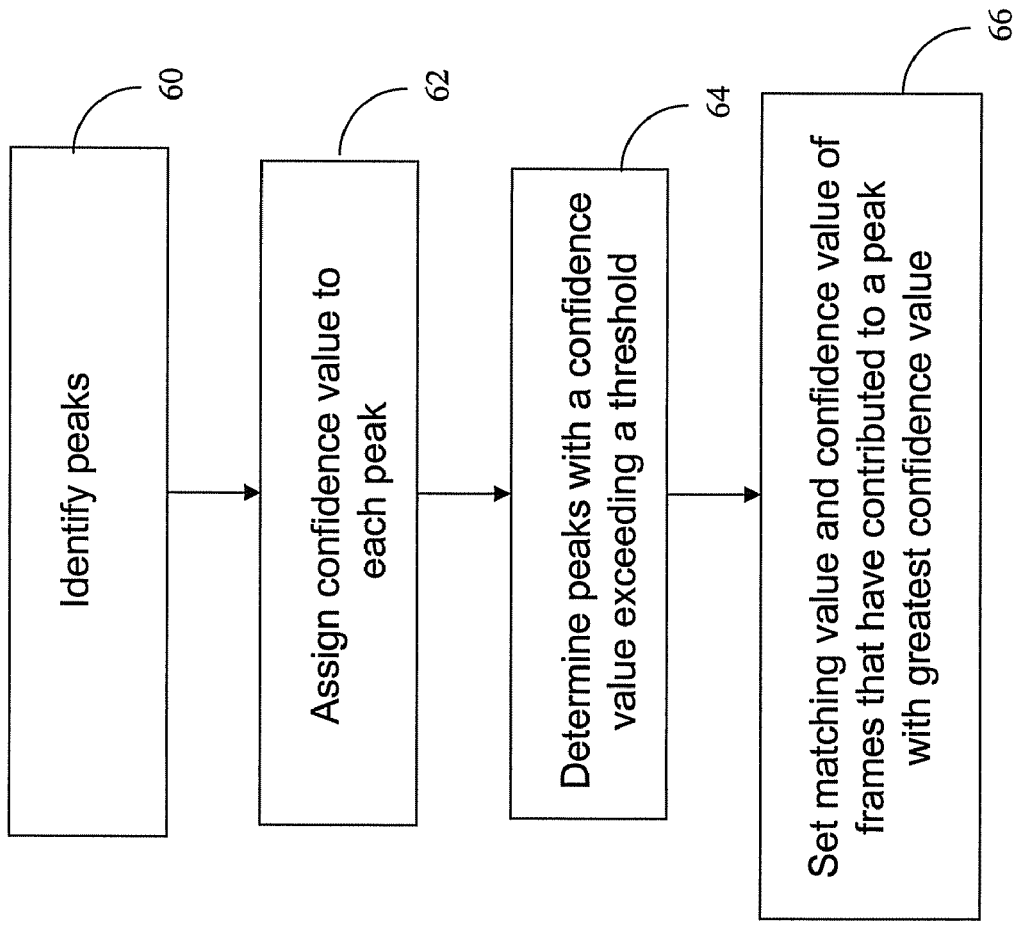
FIG. 6 is a flow chart illustrating the substeps involved in allocating a matching value to a frame.

Once the histogram has been created at step 34 (FIG. 3), for each frame of the subset a matching value corresponding to the position of the matched frame of the second signal is determined at step 36 as follows with reference to FIG. 6.

In the preferred embodiment of the invention, the matching value of each frame in the first signal is initialised to a value of −1 so it may be determined whether a matching value has yet been assigned. The position of each frame from the first signal in the second signal is held in vector p, and thus $p_i$ represents the position of the frame i of the first signal in the second signal.

For each subset of frames, referred to as the current subset in the following description, for which an associated histogram of relative delays has been generated, at step 60 peaks in the associated histogram are determined as follows. A relative delay under consideration is marked as a peak if the bin value for a first adjoining relative delay is lower and if the bin value for a second adjoining relative delay is lower or equal to the bin value for the relative delay under consideration. The bin value for relative delays outside a search range (if defined) is considered to be zero.

In an alternative embodiment for step 60, a relative delay under consideration is marked as a peak if its bin value is greater than zero.

A confidence value is assigned to each peak at step 62 in dependence upon the number of selected frames that contributed to that peak. In a preferred embodiment where a subset of ten frames is used to generate the histogram, preferred confidence values are as follows:

| Peak Value | 0 | 1 | 2 | 3 | 4 | 5 | 6 | 7 | 8 | 9 | 10 |
|---|---|---|---|---|---|---|---|---|---|---|---|
| Confidence | 0 | 0 | 0 | 1 | 2 | 2 | 3 | 3 | 4 | 4 | 5 |

A matching value and confidence value is then assigned to each frame in the current subset of frames as follows:

For each peak with a confidence value exceeding a threshold determined at step 64 (in the preferred embodiment the threshold is three) a matching value and confidence value are assigned at step 66 to each frame that has contributed to the peak as follows:

If the contributing frame does not yet have a matched frame in the second signal, then the matching value is set according to the relative delay derived from the peak under consideration and the confidence value is set to the confidence of the peak.

If the contributing frame of the first signal has already been allocated a matching value, then its current confidence value is compared with the confidence value of the peak being considered. If the confidence value of the peak has the higher value, then the matching value is reset according to the relative delay derived from the peak and the confidence value is set to the confidence of the peak; otherwise the matching and confidence values of the current frame are left unchanged.

In an alternative embodiment, if the frame of the first signal has already been allocated a matching value and the current confidence value is equal to the confidence value of the peak being considered, then the associated similarity values are compared. If the similarity value between the frame of the first signal and the frame of the second signal at the position currently set is lower than the similarity value between the frame of the first signal and the frame of the second signal being considered, then the matching value and confidence values are reset according to the relative delay and confidence value of the peak being considered; otherwise they are left unchanged.

The above steps are repeated for successive overlapping subsets of frames from the first signal until all of the frames of interest in the first signal have been included in a subset.

Figure 5:
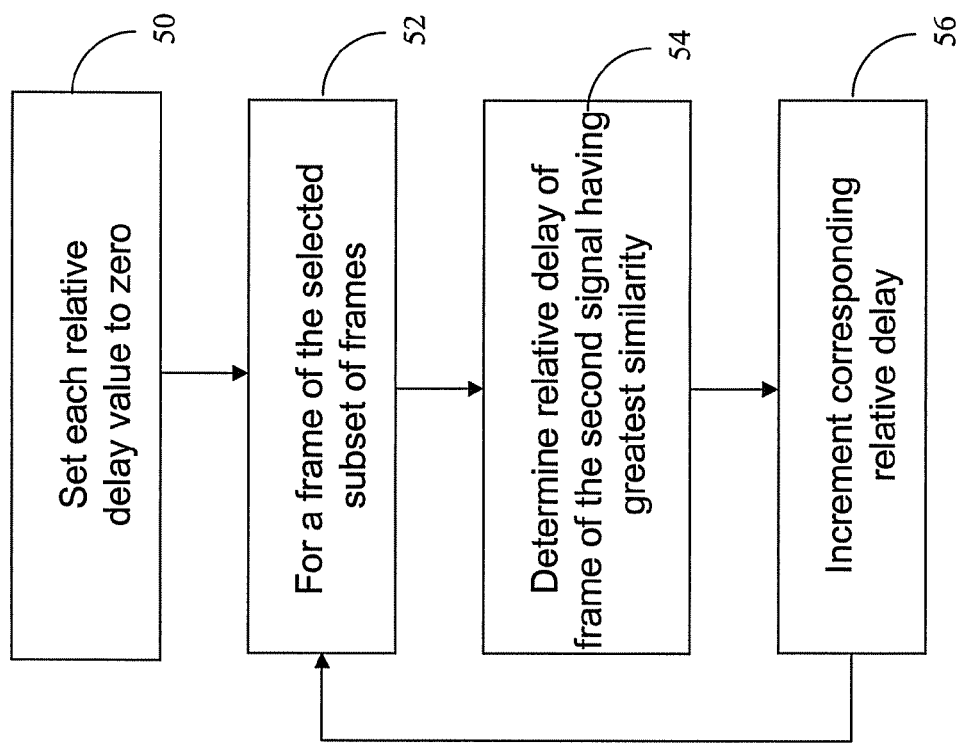
FIG. 5 is a flow chart illustrating the substeps involved in generating a histogram.

Although FIG. 5 shows the histogram being reset by setting all of the relative delay values to zero each time a new subset is selected, in practice the histogram can be updated incrementally from subset-to-subset by removing the contribution of the first frame in the preceding subset and adding the contribution of the last frame in the new subset; thus reducing computation. It will be appreciated that these two methods yield the same result and simply represent different embodiments of the invention.

Once the matching and confidence values have been updated for all frames of interest in the first signal as described above in one embodiment of the invention post processing steps are carried out as shown in FIG. 7. These steps are optional because the output of the basic alignment process may be sufficient in many applications.

The first post processing step at step 70 is to fill gaps between two matched frames in the first signal. In one embodiment of the invention for aligning two video signals this is carried out as follows:

If two matched frames of the first signal with positions a and b, referred to as boundary frames, are separated by one or more unmatched frames and the boundary frames have the same delay as each other, then the matching value of the unmatched frames is set so that the delay is the same as that of the boundary frames:

$$\text{If} \begin{cases} (p_b - p_a) = b - a \text{ and} \\ a < b - 1 \text{ and} \\ p_a \neq -1 \text{ and} \\ p_b \neq -1 \text{ and} \\ p_j = -1 \text{ for } j \in [a+1, b-1] \end{cases}$$

$$\text{then } p_i = p_a + (i - a) \text{ for } i \in [a+1, b-1]$$

Where p is a vector holding the position of each frame from the first signal in the second signal, and thus $p_i$ is the position of the frame of the second signal matching the frame of the first signal frame with position i.

If the boundary frames do not have the same delay as each other, then the matching values for the intermediate frames of the first signal between positions a and b are set to the positions of the intermediate frames of the second signal between the frames matching frames of the first signal with positions a and b, starting with the frame of the first signal preceding frame with position b and working backwards until either all of the intermediate frames of the first signal have been matched or all of the intermediate frames of the second signal have been used. In the latter case, any of the remaining unmatched intermediate frames of the first signal that are marked as static are matched to the frame of the second signal already matched to the frame with position a. This last step addresses frame freezes in the first signal. This may be summarized as follows:

$$\text{If} \begin{cases} (p_b - p_a) \neq b - a \text{ and} \\ p_a < p_b \text{ and} \\ a < b - 1 \text{ and} \\ p_a \neq -1 \text{ and} \\ p_b \neq -1 \text{ and} \\ p_j = -1 \text{ for } j \in [a+1, b-1] \end{cases}$$

$$\text{then} \begin{cases} p_i = p_b - (b - i) \\ \text{for } i \in [\max(b - (p_b - p_a), a+1), b-1] \\ \text{if frame } i \text{ is static then } p_i = p_a \\ \text{for } i \in [a+1, \max(b - (p_b - p_a), a+1)] \end{cases}$$

Where $p_i$ is the position of the frame of the second signal matching the frame of the first signal with position i.

In another embodiment of the invention for aligning two audio signals gaps between two matched reference frames are completed by linear interpolation as follows:

$$\text{If} \begin{cases} a < b - 1 \text{ and} \\ p_a \neq -1 \text{ and} \\ p_b \neq -1 \text{ and} \\ p_j = -1 \text{ for } j \in [a+1, b-1] \end{cases}$$

$$\text{then } p_i = p_a + \left\lfloor \frac{(p_b - p_a)(i - a)}{(b - a)} + 0.5 \right\rfloor \text{ for } i \in [a+1, b-1]$$

Where $p_i$ is the position of the frame of the second signal matching the first signal frame with position i and $\lfloor x \rfloor$ is the floor function, which returns the largest integer value less than or equal to x.

Optionally, if the last matched frame of the first signal is not the last frame of the first signal, then the algorithm tries to complete the alignment at step 72. The following steps occur for each of the unmatched frames after the last matched frame of the first signal If the frame of the second signal that matches best (based on the correlation matrix) an unmatched frame that is positioned (in time) after the frame of the second signal that matches the last matched frame of the first signal, this frame of the second signal is set to be the matching frame for the unmatched frame.

$$\text{If} \begin{cases} m_i \geq p_l + (i - 1) \\ i > l \end{cases} \text{ then } p_i = m_i,$$

Where i is the position of the frame of the first signal to be aligned and l is the index of the last matched frame of the first signal, $m_i$ is the position of the frame of the second signal that best matches frame of the first signal i, $p_l$ is the position of the frame of the first signal matching frame of the second signal l.

Otherwise a constant delay after the last matched frame is considered.

Finally and optionally at step 74, equivalent steps used to match unmatched frames at the end of the first signal can be used to match unmatched frames at the start of the first signal.

The application of the time-alignment process to the problem of finding a short sequence in a very long video sequence can result in a large number of calculations. In such situations, an initial coarse alignment process is performed that identifies the general region where the detailed time-alignment process described above can be can be applied using a constrained search range. This initial coarse alignment phase is similar to the basic alignment process described above, except that two additional steps are added that substantially reduce the overall computation required. These additional steps, scene detection and frame sub-sampling, are performed on the long video sequence between the feature generation step 30 and the similarity matrix calculation step 32 in the basic time-alignment process. Although the following describes the additional steps being applied to the reference video signal, it will be clear to those skilled in the art that a similar saving in computation can be achieved by applying the additional steps to the received video signal, although it should be noted that distortions in the received signal could adversely affect the accuracy of the scene change detection.

Scene detection is performed on the reference video signal to be aligned by analysing frames within the reference video signal. To identify scene changes, a similarity measure is determined between a current frame in the reference sequence and a plurality of preceding frames and a plurality of succeeding frames in the same sequence. From these similarity measures, the position of a predetermined number of frames with the highest similarity to the current frame is determined. In the preferred embodiment, ten preceding and ten succeeding frames are considered, and the eight frames with the highest similarity measure when compared with the current frame are determined.

If all of the eight frames are positioned before the current frame and if the similarity measure between the current frame and the following frame is lower than a threshold, then the current frame is marked as the end of a scene (and the next frame is marked as the start of a scene). In the preferred embodiment using correlation as the similarity measure with a threshold of 0.992 has been found to work well.

If all the eight frames with the highest similarity are positioned after the current frame, and if the similarity between the current frame and the previous one is lower than a threshold, then the current frame is marked as the beginning of a scene (and the previous frame is marked as the end of a scene). In the preferred embodiment using correlation as the similarity measure with a threshold of 0.992 has been found to work well.

In the preferred embodiment, the scene detection process is not applied to a first and last plurality of frames of the reference sequence; however, the first frame of the sequence is marked as the start of a scene and the last frame of the sequence is marked as the end of a sequence. In the preferred embodiment the scene detection process is not applied to the first or last ten frames of the video signal.

In order to reduce the computation required for time alignment, the frames used in the calculations can be sub-sampled. A second copy of the sequence of YUV vectors corresponding to the reference video signal is calculated that only contains a subset of the vectors from each scene identified by the scene detection step. A subset comprising the YUV vectors from a single frame from each scene has been found to work well.

The coarse time-alignment process then continues as described before using the sub-sampled sequence of YUV vectors corresponding to the reference video signal. In this case, the resolution of delay histograms is no longer equal to a single frame but to a plurality of frames. In the preferred embodiment, the width of each bin corresponds to twice the length of the longest scene detected in the reference signal.

Once the coarse alignment step is complete a more detailed alignment phase can be performed according to the invention using a constrained search range. Thus complexity of the detailed alignment can be limited.

This coarse alignment step can also be used to align two very long video sequences by dividing the first sequence into a number of smaller sub-sequences of fixed duration or optionally using the scene detection method described above, and then aligning each short sub-sequence to the long second sequence using the initial coarse alignment phase described above to identify the region of the second sequence to be searched in detail.

A similar process to that described above can be used to reduce the computation required for the time alignment of audio signals based on the process of dividing the reference signal into sections of active audio comprising frames which are similar to one another and producing a copy of the reference audio signal that only contains a subset of frames from each active audio section. Active sections of audio might be tracks on a compact disk, for example.

It will be apparent to those skilled in the art that although the present invention has been described in the context of its application in quality assessment models, the invention may be used in a much broader, general set of applications where the time-alignment of the whole or portions of pairs of signals is required. Such applications include search algorithms, which are typically used to detect the presence of a short sequence in a much longer sequence, for example in digital rights management and broadcast verification systems.

It will be understood by those skilled in the art that the processes described above may be implemented on a conventional programmable computer, and that a computer program encoding instructions for controlling the programmable computer to perform the above methods may be provided on a computer readable medium.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognised that various alterations, modifications, and/or additions may be introduced into the constructions and arrangements of parts described above without departing from the scope of the present invention as defined in the appended claims.

The invention claimed is:

1. A method of aligning a first signal comprising a sequence of frames with a second signal comprising a sequence of frames, the method comprising the steps of:
   determining a similarity measure between each of a plurality of frames of the first signal and each of a plurality of frames of the second signal;
   assigning a matching value to each frame of said plurality of frames of the first signal wherein the matching value indicates a relative position of a matching frame in the second signal, by repeating the sub-steps of:
      selecting a subset of frames of the first signal and generating a relative delay histogram, the histogram comprising a set of values corresponding to each of a set of relative delays by:
         for each frame of said subset identifying the frame of the second signal having the greatest similarity with said frame;
         determining the relative delay between the identified frame of the second signal and said frame of the first signal; and
         incrementing the value of the histogram corresponding to said relative delay;
      identifying one or more peaks in the relative delay histogram;
      assigning a confidence value to each identified peak;
      assigning a matching value and an associated confidence value to each frame contributing to a peak in dependence upon said identified peaks and the confidence values of each identified peak.

2. A method according to claim 1, in which the steps of selecting a subset of frames of the first signal and generating a relative delay histogram, identifying one or more peaks in the relative delay histogram and assigning the matching value to each frame contributing to a peak are repeated until each frame of said plurality of frames in the first signal have been included in a subset.

3. A method according to claim 1, in which the confidence value is determined in dependence upon the number of frames in the selected subset which contributed to said identified peaks.

4. A method according to claim 2, in which the step of assigning a matching value to each frame contributing to a peak comprises the sub-steps of;
   for each identified peak with a confidence value higher than a threshold:
      if the frame has no matching value and associated confidence value assigned then the matching value and the associated confidence value of the peak is assigned to the frame;
      if the frame has a matching value and associated confidence value assigned then in the event that the peak has a confidence value greater than the assigned associated confidence value the matching value and the associated confidence value of the peak is assigned to the frame.

5. A method according to claim 4, further comprising the sub-step of:
   in the event that the peak has a confidence value equal to the assigned associated confidence value the matching value and the associated confidence value of the peak is assigned to the frame only in the event that the similarity between the frame and the frame associated with the current matching value is less than the similarity between the frame and the frame associated with the matching value of the peak.

6. A method according to claim 1, in which the first and second signals comprise audio signals, and in which the similarity measure is determined between a plurality of active frames of the first signal and a plurality of active frames of the second signal and in which an active frame comprises a frame containing speech.

7. A method according to claim 1, in which the first and second signals comprise video signals and in which the similarity measure is determined between a plurality of active frames of the first signal and a plurality of active frames of the second signal and in which an active frame comprises a frame which is not static.

8. A method according to claim 7, in which an active frame further comprises a frame which is not blank.

9. A method according to claim 6, in which the selected subset comprises a plurality of adjacent active frames.

10. A method according to claim 1, in which a coarse alignment is performed by performing the coarse alignment steps of:
   identifying a plurality of subsets of similar frames of the first signal; and
   selecting one or more active frames from each subset of similar frames of the first signal; and
   determining the similarity measure between said selected active frames of the first signal and a plurality of frames of the second signal.

11. A method according to claim 10 in which the method further comprises the step of subsequently performing a fine alignment according any one of claims 1 to 10, where the plurality of frames of the first signal and the plurality of frames of the second signal to be aligned are selected in dependence upon the matching values generated during the coarse alignment steps.

12. A method according to claim 1, in which the step of generating a similarity measure comprises the sub-steps of:
   sub-sampling the plurality of frames of the first signal; and
   sub-sampling the plurality of frames of the second signal;
prior to generating the similarity measure.

13. A method of aligning a first signal comprising a sequence of frames with a second signal comprising a sequence of frames, the method comprising the steps of:
- determining a similarity measure between each of a plurality of frames of the first signal and each of a plurality of frames of the second signal;
- assigning a matching value to each frame of said plurality of frames of the first signal wherein the matching value indicates a relative position of a matching frame in the second signal, by repeating the sub-steps of:
  - selecting a subset of frames of the first signal and generating a relative delay histogram, the histogram comprising a set of values corresponding to each of a set of relative delays by:
    - for each frame of said subset identifying the frame of the second signal having the greatest similarity with said frame;
    - determining the relative delay between the identified frame of the second signal and said frame of the first signal; and
    - incrementing the value of the histogram corresponding to said relative delay;
  - identifying one or more peaks in the relative delay histogram;
  - assigning a matching value to each frame contributing to a peak in dependence upon said identified peaks;
  - determining a frame which has no matching value assigned; and
  - assigning a matching value in dependence upon a matching value assigned to a preceding frame and a matching value assigned to a subsequent frame.

14. A method according to claim 1, in which the method further comprises:
- determining a first matched frame to which a matching value is assigned;
- if the first matched frame is not the first frame of the sequence, assigning a matching value to preceding unmatched frames in dependence upon the matching value of the first matched frame.

15. A method according to claim 1, in which the method further comprises:
- determining a last matched frame to which a matching value is assigned;
- if the last matched frame is not the last frame of the sequence, assigning a matching value to preceding unmatched frames in dependence upon the matching value of the last matched frame.

16. A method of signal quality assessment comprising the steps of:
- transmitting a reference signal to provide a transmitted signal;
- receiving said transmitted signal to provide a received signal;
- comparing the received signal to the reference signal; and
- generating a quality measure in dependence upon said comparison;

characterised in that the step of comparing said received signal to said reference signal comprises the sub-steps of aligning the reference signal and the received signal according to to claim 1 prior to comparing the received signal to the reference signal.

17. A non-transitory computer readable medium carrying a computer program for implementing the method according to claim 1.

18. A computer program product for aligning the first signal of claim 1, the computer program product comprising a non-transitory computer-readable storage medium storing instructions that when executed cause at least one processor to perform steps implementing the method according to claim 1.

19. An apparatus for signal quality assessment comprising:
- a processor for generating a quality measure; and
- a store for storing said quality measure, wherein the processor is arranged in operation to generate the quality measure in accordance with claim 16.

* * * * *

UNITED STATES PATENT AND TRADEMARK OFFICE
CERTIFICATE OF CORRECTION

PATENT NO. : 8,363,938 B2
APPLICATION NO. : 12/427212
DATED : January 29, 2013
INVENTOR(S) : Ludovic Malfait and Benjamin Pernot It is certified that error appears in the above-identified patent and that said Letters Patent is hereby corrected as shown below:

Title Page, right column, line 4, delete "Jan. 3, 2012" and insert --March 1, 2012--.

In the Claims:

Column 18, line 21, delete "to to" and insert --to--.

Signed and Sealed this
Thirteenth Day of August, 2013

Teresa Stanek Rea
*Acting Director of the United States Patent and Trademark Office*